United States Patent
Arevalo Rodriguez et al.

(10) Patent No.: US 9,771,140 B2
(45) Date of Patent: Sep. 26, 2017

(54) AIRCRAFT STRUCTURE WITH INTEGRATED REINFORCING ELEMENTS

(71) Applicant: Airbus Operations S.L., Getafe (Madrid) (ES)

(72) Inventors: Elena Arevalo Rodriguez, Getafe (ES); Estelle Baligand, Getafe (ES)

(73) Assignee: Airbus Operations S.L., Madrid (ES)

( * ) Notice: Subject to any disclaimer, the term of this patent is extended or adjusted under 35 U.S.C. 154(b) by 1010 days.

(21) Appl. No.: 14/140,511

(22) Filed: Dec. 25, 2013

(65) Prior Publication Data

US 2014/0186572 A1    Jul. 3, 2014

(30) Foreign Application Priority Data

Dec. 28, 2012  (EP) .................................. 12382547

(51) Int. Cl.
| | |
|---|---|
| *B64C 1/06* | (2006.01) |
| *B64C 1/12* | (2006.01) |
| B64C 1/14 | (2006.01) |
| B64C 3/18 | (2006.01) |
| B64C 1/00 | (2006.01) |

(52) U.S. Cl.
CPC .............. *B64C 1/061* (2013.01); *B64C 1/064* (2013.01); *B64C 1/12* (2013.01); *B32B 2605/18* (2013.01); *B64C 1/1461* (2013.01); *B64C 3/18* (2013.01); *B64C 3/182* (2013.01); *B64C 2001/0072* (2013.01); *Y02T 50/433* (2013.01); *Y10T 428/24008* (2015.01)

(58) Field of Classification Search
CPC  B64C 1/061; B64C 1/064; B64C 1/12; B64C 2001/0072; B64C 3/182; B64C 1/1461; B64C 3/18; B64C 1/065; B64C 1/069; B64C 3/185; B64C 3/187; B64C 1/06; Y02T 50/433; Y02T 50/42; B32B 2605/18; B29D 99/0033; Y10T 29/49622
See application file for complete search history.

(56) References Cited

U.S. PATENT DOCUMENTS

| | | |
|---|---|---|
| 2005/0003145 A1 | 1/2005 | Toi et al. |
| 2008/0010942 A1 | 1/2008 | Normand et al. |
| 2009/0266936 A1 | 10/2009 | Fernandez et al. |
| 2010/0181428 A1* | 7/2010 | Noebel .................. B64C 1/064   244/131 |
| 2011/0159242 A1* | 6/2011 | Arevalo Rodr Guez .................. B29D 99/0003   428/157 |

(Continued)

OTHER PUBLICATIONS

European Search Report, May 29, 2013.

*Primary Examiner* — Aaron Austin
*Assistant Examiner* — Jasper Saberi
(74) *Attorney, Agent, or Firm* — Greer, Burns & Crain, Ltd.

(57) ABSTRACT

The invention provides an integrated aircraft structure, such as a fuselage, with reinforcing elements in areas of the structure that need them because they have openings or are subjected to high loads. The structure comprises a skin, a plurality of stringers and a plurality of frames with mouseholes for the passage of stringers at their crossing zones. The reinforcing elements are configured with a suitable shape to be superimposed to the stringers in said areas. A manufacturing processes of said integrated aircraft structure is also provided.

16 Claims, 4 Drawing Sheets

(56) References Cited

U.S. PATENT DOCUMENTS

| | | | |
|---|---|---|---|
| 2011/0315824 A1* | 12/2011 | Pook | B29C 70/443 |
| | | | 244/133 |
| 2012/0034416 A1* | 2/2012 | Lutz | B64C 1/061 |
| | | | 428/121 |
| 2012/0211602 A1* | 8/2012 | Dugerie | B64C 1/1461 |
| | | | 244/119 |
| 2012/0248247 A1* | 10/2012 | Vinue Santolalla | B64C 1/12 |
| | | | 244/119 |

* cited by examiner

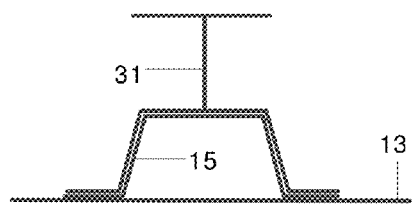
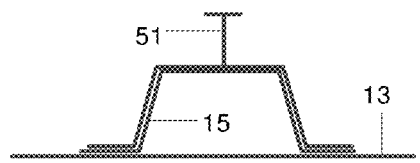
FIG. 2b    FIG. 2c
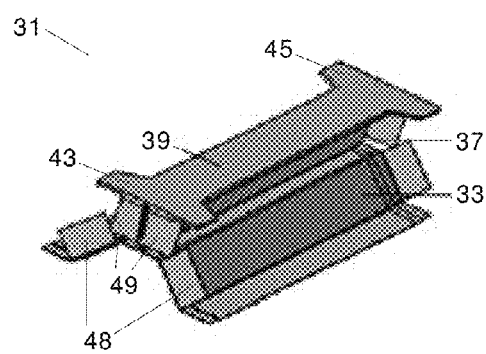
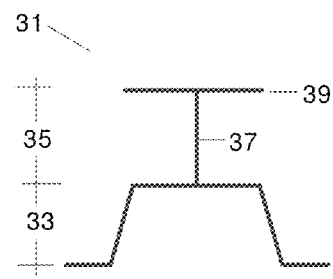
FIG. 3a    FIG. 3b
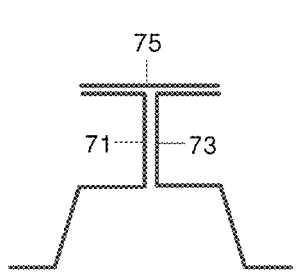
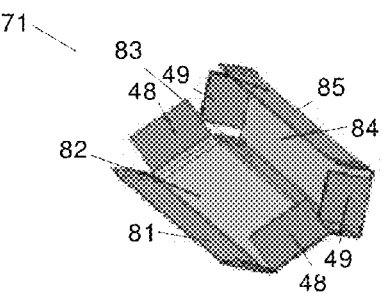
FIG. 4a    FIG. 4b
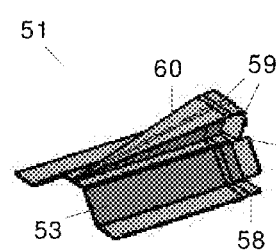
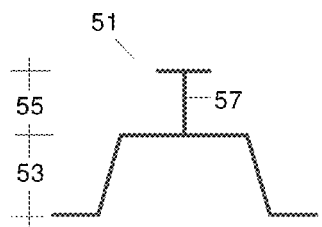
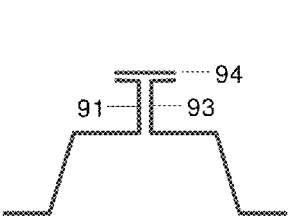
FIG. 5a    FIG. 5b    FIG. 5c

AIRCRAFT STRUCTURE WITH INTEGRATED REINFORCING ELEMENTS

CROSS-REFERENCES TO RELATED APPLICATIONS

This application claims the benefit of the European patent application No. 12382547.3 filed on Dec. 28, 2012, the entire disclosures of which are incorporated herein by way of reference.

FIELD OF THE INVENTION

The present invention relates to an aircraft structure of composite material with an integrated reinforcing structure in areas with openings or subjected to high loads.

BACKGROUND OF THE INVENTION

The main structure of the fuselage of an aircraft typically comprises a skin with stringers and frames. The skin is stiffened longitudinally by stringers to reduce its thickness and be competitive in weight, while the frames prevent the general instability of the fuselage and may be subjected to local load inputs.

As the aeronautical industry requires structures which, on the one hand, must support the loads to which they are subjected, thus fulfilling high requirements of strength and stiffness, and, on the other hand, must be as light as possible, the use of composite materials in aircraft primary structures has been increasingly spread since by conveniently using said composite materials significant weight savings can be achieved compared to traditional designs made of metallic materials.

In areas of aircraft structures with openings or subjected to high loads, for example, those areas of the fuselage of an aircraft withstanding the load inputs from the floor of the aircraft cabin, special requirements arise.

FIGS. 1a and 1b show two known solutions in the art to meet these requirements in the case of fuselages which use longitudinal beams instead of stringers in areas with openings to stiffen and reinforce them. Crosses between beams and frames are made such that only one of the two elements is maintained continuous (whether the beams or the frames). This implies that both elements shall be thereafter joined in the crossing zones by a plurality of connecting elements (riveted or bonded), resulting in high weight penalties and/or high production and assembly costs and also debonding risks when using connecting elements bonded to the beams and the frames.

The present invention is directed to solving these problems.

SUMMARY OF THE INVENTION

The basic object of the present invention is to provide reinforcing elements of an aircraft structure such as a fuselage to be applied in areas of the structure that need them because they have openings or are subjected to high loads.

In the case of a fuselage, said structure comprises a skin as a base, longitudinal stringers having preferably an omega-shaped or a T-shaped cross section and transverse frames, all of them made of a composite material that may be carbon fiber or glass fiber with thermosetting or thermoplastic resin.

The purpose of the reinforcing elements of the invention is twofold: on one hand it aims to achieve a simpler and, therefore, less expensive concept and, on the other hand, is oriented to provide a more uniform load transfer between the various elements forming the structure, so as to avoid potential debonding problems. Thus, the invention provides an improved aircraft structure because it comprises reinforcing elements with continuity at crossing zones, said elements being also integrated in the structure.

To this end, the invention proposes to keep the trace of stringers and frames in the fuselage area needing reinforcement and join to the stringers in that specific area some reinforcing elements, which are also joined to the frames. Those specific elements are configured to withstand the loads involved and to allow the ensemble of the reinforcing elements to be manufactured together with the rest of the structure in a fully integrated manner, i.e., without any mechanical attachments.

Those specific elements comprise inner reinforcing elements of the stringers in the stretch located between two adjacent and outer reinforcing elements in stretches at both sides of said frames.

The inner reinforcing elements are configured with a lower part having a suitable shape to be superimposed on to the stringers and an upper part with a web having joining flaps to the web of the frames and a cap having joining end portions to the top of the frames.

The outer reinforcing elements are configured with a suitable shape to be superimposed on to the stringers and an upper part with a web having joining flaps to the web of the frames and, optionally, a cap with a joining portion end to the top of the frames. The web and the cap may have, respectively, a height and a width variable from the end in contact with a frame to its other end.

An aircraft structure with said specific reinforcing elements solves problems of the prior art:
  Provides load continuity along the stringers, keeping the passage of the stringers through mouseholes in the frames in the reinforced area.
  Eliminates rivets and extra parts that increase the weight of the structure.

Another object of the present invention is to provide manufacturing processes of an aircraft structure with the above mentioned specific reinforcing elements integrating all components.

The specific reinforcing elements of the stringers can be provided as separate components and then joined with the sub-ensemble skin-stringers and with the frames to form an integrated structure The specific reinforcing elements of the stringers can also be joined to the frames and said sub-ensemble be joined to the sub-ensemble skin-stringers.

The above processes are particularly applicable to complete fuselage manufacturing processes ("one-shot") and to panelized fuselages manufacturing processes.

Other characteristics and advantages of the present invention will be clear from the following detailed description of embodiments illustrative of its object in relation to the attached Figures.

BRIEF DESCRIPTION OF THE DRAWINGS

FIG. 2a is a schematic perspective view of an aircraft structure which includes reinforcing elements according to one embodiment of the present invention and FIGS. 2b and 2c are cross sections along the planes A-A and B-B.

FIG. 3a is a schematic perspective view of an inner reinforcing element of a stringer according to an embodiment of the present invention and FIG. 3b is a schematic cross section of said inner reinforcing element.

FIG. 4a is a schematic cross section of the preforms used for forming said inner reinforcing element according to one embodiment of the present invention and FIG. 4b is a schematic perspective view of one of these preforms.

FIG. 5a is a schematic perspective view of an outer reinforcing element of a stringer according to an embodiment of the present invention, FIG. 5b is a schematic cross section of said outer reinforcing element and FIG. 5c a schematic cross section of the preforms used to form an outer reinforcing element according to an embodiment of the present invention.

DETAILED DESCRIPTION OF THE PREFERRED EMBODIMENTS

We will now describe in detail the aircraft structure of the invention with reference to the structure of an aircraft fuselage, but the invention is also applicable to structures of aircraft wings or tail planes.

As is well known the typical structure of an aircraft fuselage is formed by a skin, transverse frames and longitudinal stringers. The skin withstands longitudinal, transversal and in-plane shear loads, hence, to achieve sufficient axial rigidity and stability against buckling of the skin, without increasing its thickness, said longitudinal stringers which mainly withstand the structure longitudinal loads are used. On the other hand, the fuselage structure further comprises multiple frames which mainly withstand the transverse loads of the fuselage structure, maintain the aerodynamic surface and prevent the overall instability of the fuselage.

The fuselage areas that are subjected to high loads or include openings must include reinforcing structures.

Figure 1A:
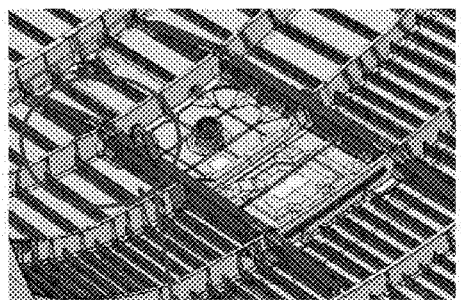
FIGS. 1a and 1b are schematic perspective views of reinforced areas of an aircraft fuselage, including an enlargement of a crossing zone between frames and reinforcing beams, according to the prior art.
Figure 1B:
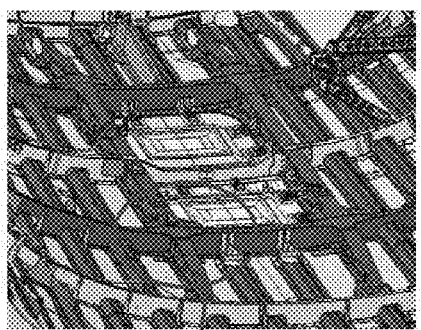
Figure 2A:
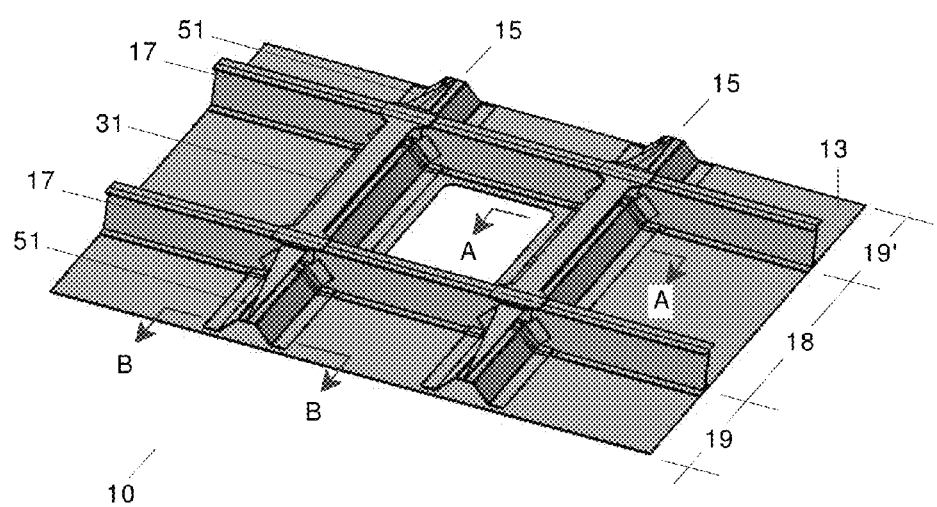

FIG. 2a shows a structure 10 of an aircraft fuselage having an opening in a skin area bounded by two adjacent frames 17 and two adjacent stringers 15 and which is reinforced according to an embodiment of the invention.

The reinforcing structure, applied on the stringers 15, is formed by two inner reinforcing elements 31 arranged in the stretches 18 located between said frames 17 and by four outer reinforcing elements 51 in the stretches 19, 19' at both sides of said frames 17. The inner and outer reinforcing elements 31, 51 are joined in an integrated manner to the stringers 15 and to the frames 17.

FIGS. 2b and 2c respectively show schematic cross sections of FIG. 2a along the planes A-A and B-B where the inner and outer reinforcing elements 31, 51, the stringers 15 and the skin 13 can be seen (in FIGS. 2b and 2c a gap is left between them for illustration purposes).

Following FIGS. 2a, 3a and 3b it can be seen that, in an embodiment of the invention, the main features of the inner reinforcing elements 31 are that they are configured by a lower part 33 with the same omega shape of the stringers 15 to which they are joined and an upper part 35 formed by a web 37 and a cap 39 with end portions 43, 45 configured to be arranged over the frames 17. The inner reinforcing elements 31 also comprise joining flaps 48, 49 to the web of the frames 17, as discussed in more detail below.

Following FIGS. 4a and 4b, the three preforms used in a preferred embodiment of the invention for forming the inner reinforcing elements 31 can be seen: two symmetrical preforms 71, 73 to form its body and a preform 75 to form its cap. The term "laminated preform" as used in this specification designates a composite element that is intended to be integrated with other elements in the manufacturing process of the product to which it belongs.

The lower part of the preform 71, having a cross-section with the shape of half an omega, is formed by the surfaces 81, 82 and 83, the inclined surface 82 comprising the joining flaps 48 to the web of the frames 17 and being the surfaces 81 the joining feet to the skin 13.

The upper part of the preform 71 is formed by surfaces 84 and 85 intended to form part, respectively, of the web 37 and of the inner part of the cap 39, the vertical surface 84 comprising the joining flaps 49 to the web of the frames 17.

Following FIGS. 5a, 5b and 5c it can be seen that, in an embodiment of the invention, the main features of the outer reinforcing elements 51 are that they are configured by a lower part 53 with the same omega shape of the stringers 15 to which they are joined and an upper part 55 formed by a web 57 of decreasing height from a maximum height at the end attached to the frame 17 to a zero height at the other end and a cap 60 of decreasing width from a maximum width at the end attached to the frame 17 to a zero width at the other end.

The outer reinforcing elements 51 also comprise joining flaps 58, 59 to the web of the frames 17, as discussed in more detail below.

The preforms used for the outer reinforcing elements 51 are two preforms 91, 93 to form its omega shaped lower part, its web and its cap and a flat preform 94 on top of said cap.

Figure 9:
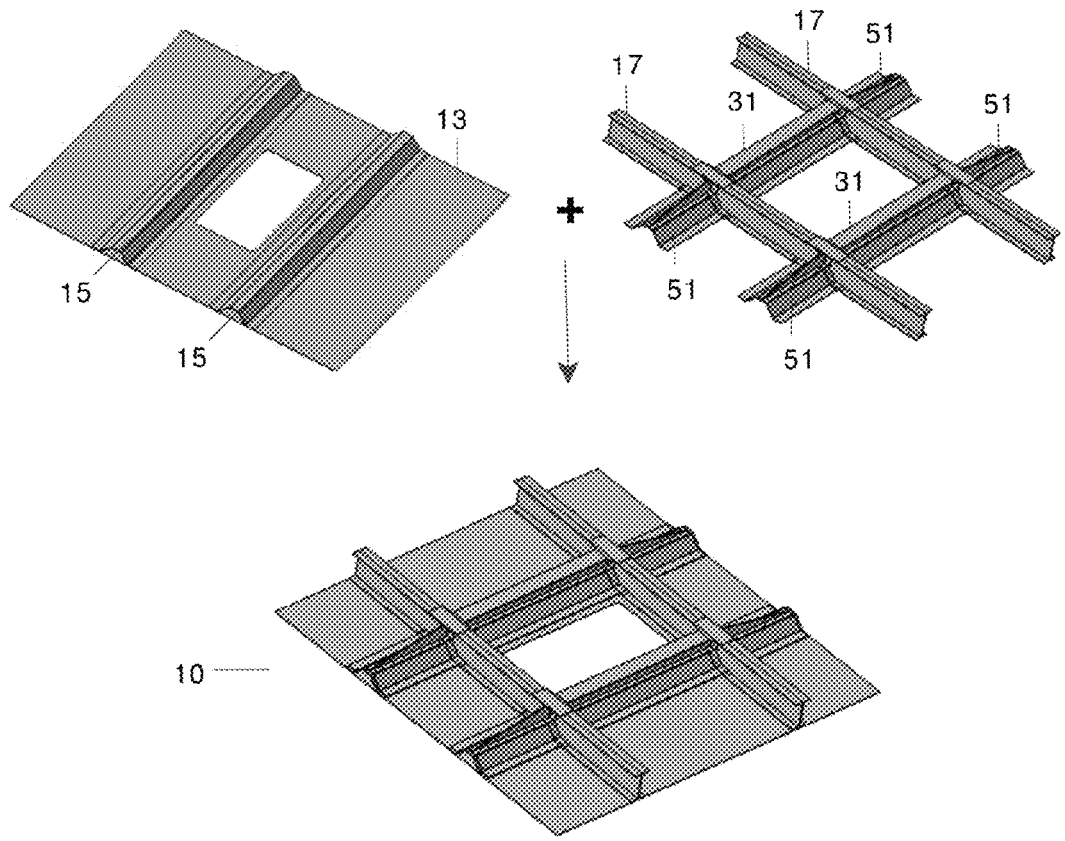
FIG. 9 shows the basic steps of a manufacturing process of an aircraft fuselage structure comprising reinforcing elements according to another embodiment of the present invention.

In another embodiment of the invention, the outer reinforcing elements 51 have no cap 60 (see FIG. 9).

As mentioned above, the configuration of the lower part of the inner and outer reinforcing elements 31, 51 is dependent on the configuration of the stringers 15.

Figure 6A:
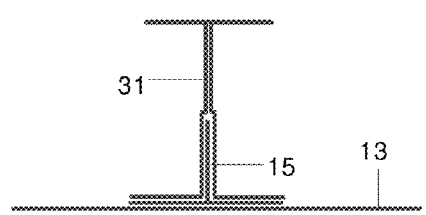
FIGS. 6a and 6b are, respectively, a cross section of an inner reinforcing element according to an embodiment of the invention for a T-shaped stringer and a cross-section of the preforms used to conform it.
Figure 6B:
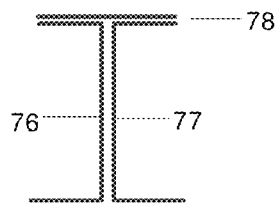

In FIGS. 6a and 6b, the configuration of an inner reinforcing element 31 joined to a stringer 15 having a T-shaped cross section and the preforms 76, 77 used for forming it are, respectively, shown.

Figure 7:
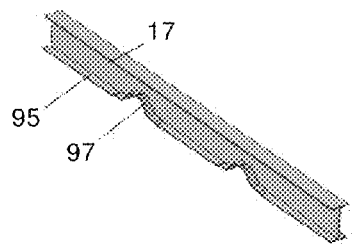
FIG. 7 is a perspective view of a frame with mouseholes for stringer passage.

Furthermore, as shown in FIG. 7, in one embodiment of the invention the frames 17 with mouseholes for the stringers 15, are configured with an I shaped cross section with a foot 95 which facilitates its joining to the skin 13 and flanges 97 that facilitate its joining to the longitudinal stringers 15 in their crossing zone.

According to the invention, the above-mentioned aircraft structure is manufactured through highly integrated processes. An integrated structure shall be understood as a structure where the various structural elements forming the structure are made of composite material and the structure is manufactured in one shot taking advantage in this respect of the nature of the composites material. As they are made up of independent layers which can be laid-up as desired, they offer a greater possibility of integration of the structure, which also results in cost savings by having fewer individual parts to assemble.

Figure 8:
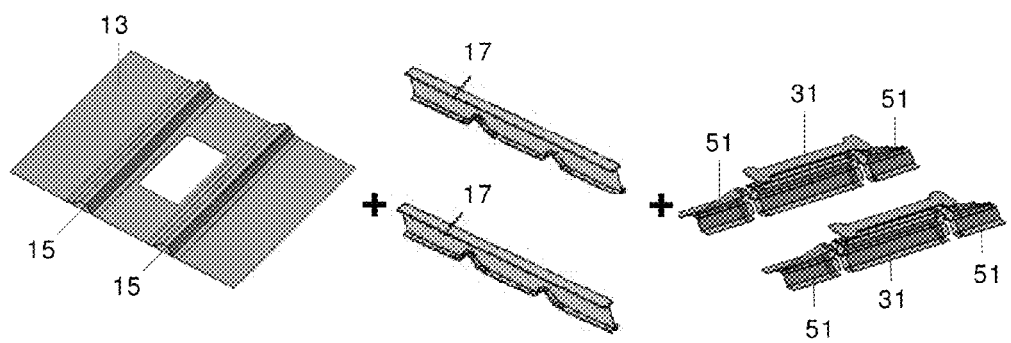
FIG. 8 shows the basic steps of a manufacturing process of an aircraft fuselage structure comprising reinforcing elements according to one embodiment of the present invention.
Figure 8:
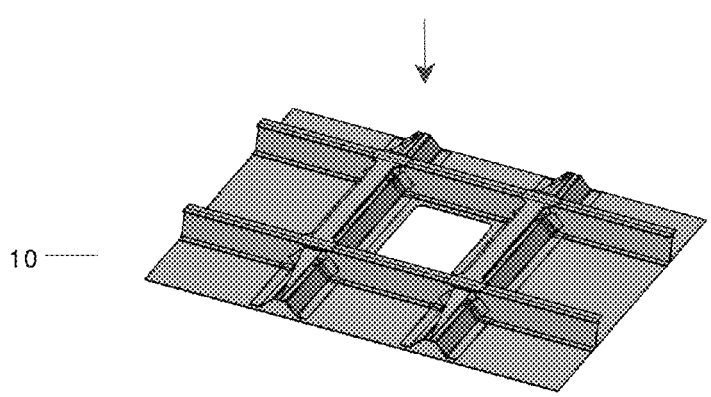

In an embodiment of the invention shown in FIG. 8 the manufacturing process of an aircraft fuselage structure 10 with the reinforcing structure which we have described comprises the following steps:

a) Providing the ensemble of the skin 13 and the stringers 15 in uncured state, the frames 17 in semi-cured or cured state and the inner and outer reinforcing elements 31, 51 in uncured, semi-cured or cured state.

b) Assembling these components in a curing tool and joining them in an autoclave cycle in predetermined conditions of temperature and pressure.

The components are joined by a process of co-curing or co-bonding in the autoclave cycle depending on their state.

In step a), as illustrated in FIG. 8, the inner reinforcing elements 31 are provided in two components. The first of these is the upper part of its cap, i.e., the preform 75 of FIG. 4*a* (for an omega-shaped stringer) or the preform 78 of FIG. 6*b* (for a T-shaped stringer). The second is its body which is formed joining the symmetric preforms 71, 73 (for an omega-shaped stringer) or the preforms 76, 77 (for a T-shaped stringer).

The outer reinforcing elements 51 are provided in one or two components depending on their configuration with or without a cap with a joining end to the top of the frames. Their body is formed joining the symmetric preforms 91, 93 for an omega-shaped stringer.

In this embodiment of the invention, frames 17 configured with I, C, J or Z-shaped cross sections can be used.

In another embodiment of the invention illustrated FIG. 9, the manufacturing process of an aircraft fuselage structure 10 with the reinforcing structure which we have described comprises the following steps:

a) Providing the ensemble of the skin 13 and the stringers 15 in uncured state, and the frames 17 with the inner and outer reinforcing elements 31, 51 integrated in a semi-cured or cured state.

b) Assembling these components in a curing tool and joining them in an autoclave cycle in predetermined conditions of temperature and pressure.

Figure 10:
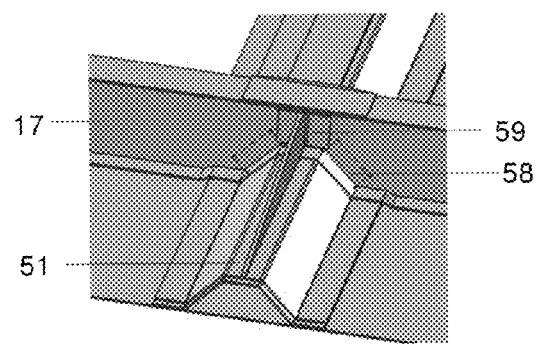
FIG. 10 is a detailed view of FIG. 9 in a crossing zone of a frame with a stringer provided with an outer reinforcing element.

In this case, as illustrated in FIG. 10, the flaps 58 of the outer reinforcing elements 51 (and similarly the flaps 48 of the inner reinforcing elements 31) can be integrated within the laminate that forms the web of the frame 17, thus improving the bonded union between the frames 17 and the inner and outer reinforcing elements 31, 51. There is therefore no debonding risk between these elements, thus involving a significant advantage over the solution of the prior art mentioned in the background using external connecting elements bonded to the beams and the frames.

In this embodiment of the invention, frames 17 configured with I, or J-shaped cross sections can be used.

The composite material used in the inner and outer reinforcing elements 31, 51 may comprise glass or carbon fibers, the type of resin used being thermoplastic or thermosetting (epoxy, bismaleimide, phenolic, . . . ). The composite material can be prepreg or dry fiber.

Although the present invention has been described in connection with various embodiments, it will be appreciated from the specification that various combinations of elements, variations or improvements therein may be made, and are within the scope of the invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An integrated aircraft structure of composite material comprising:
   a skin,
   a plurality of stringers, and,
   a plurality of frames, each frame having a web;
   at least two adjacent stringers from the plurality of stringers and at least two adjacent frames from the plurality of stringers intersecting to form a crossing zones;
   the at least two frames comprising mouseholes for the passage of the at least two stringers at the crossing zones;
   an inner reinforcing element, made of a composite material, for at least one of the at least two adjacent stringers a stretch located within the cross zone and between two adjacent frames;
   said inner reinforcing element comprising a lower part configured with a suitable shape to be superimposed to the stringer in said stretch and an upper part configured with a web and a cap;
   the lower part and the web including respectively at their ends joining flaps to the web of the adjacent frames;
   the lower part including resting feet on the skin.

2. The integrated aircraft structure according to claim 1, wherein said cap comprises joining end portions to the top of the adjacent frames.

3. The integrated aircraft structure according to claim 1, further comprising:
   two outer reinforcing elements, made of a composite material, for said stringer in two stretches at both sides of said adjacent frames that end before the crossing of the stringer with other frames;
   said outer reinforcing elements comprising a lower part configured with a suitable shape to be superimposed to said stringer and an upper part configured with a web;
   the lower part and the web including respectively at their end in contact with the frames joining flaps to their webs.

4. The integrated aircraft structure according to claim 3, wherein the upper part also includes a cap.

5. The integrated aircraft structure according to claim 4, wherein said cap includes a joining end portion to the top of the adjacent frame.

6. The integrated aircraft structure according to claim 3, wherein the height of the upper part is variable from an initial height at the beginning of the stretches to a zero height at their ends.

7. The integrated aircraft structure according to claim 4, wherein the width of the cap is variable from an initial width at the beginning of the stretches to a zero width at their ends.

8. The integrated aircraft structure according to claim 1, wherein the shape of the cross section of the stringers is selected from the group consisting of omega and T.

9. The integrated aircraft structure according to claim 1, wherein a shape of the cross section of the upper part of said inner reinforcing element comprises a T.

10. An integrated aircraft structure of composite material comprising:
    a skin,
    a plurality of stringers, and, a plurality of frames, each frame having a web;

two adjacent stringers from the plurality of stringers and two adjacent frames from the plurality of stringers intersecting to form a crossing zone;

the two frames comprising mouseholes for the passage of the two stringers at the crossing zone;

an inner reinforcing element, made of a composite material, for at least one of the two adjacent stringers a stretch located within the cross zone and between the two adjacent frames;

said inner reinforcing element comprising a lower part configured with a suitable shape to be superimposed to the stringer in said stretch, an upper part configured with a web and a cap, and joining flaps joined to one of the webs the two adjacent frames, wherein a shape of the cross section of the upper part of said inner reinforcing element comprises a T;

at least one outer reinforcing element, made of a composite material, for one of the two adjacent stringers in a stretch outside of the crossing zone;

said at least one outer reinforcing element comprising a lower part configured with a suitable shape to be superimposed to said one of the two adjacent stringers and an upper part configured with a web;

the lower part of the at least one outer reinforcing element and the web of the at least one outer reinforcing element including respectively at their ends, joining flaps joined to a web a frames.

11. A manufacturing process of an integrated aircraft structure according to claim 1, comprising the following steps:

a) providing in uncured state the skin and the stringers, in one of semi-cured and cured state, the frames, and in one of uncured, semi-cured and cured state, the inner and outer reinforcing elements;

b) assembling said components on a curing tool and joining them through one autoclave cycle.

12. The manufacturing process according to claim 11, wherein in said step a) the inner reinforcing element is provided in two components, being the first of them a preform of its cap and being formed the second one joining two symmetrical preforms.

13. The manufacturing process according to claim 11, wherein the shape of the cross section of the frames is selected from the group consisting of I, C, J and Z.

14. The manufacturing process of an integrated aircraft structure according to claim 1, comprising the following steps:

a) providing in uncured state the skin and the stringers, and in one of a semi-cured and cured state, the frames with the inner and outer reinforcing elements integrated;

b) assembling said components on a curing tool and joining them through one autoclave cycle.

15. The manufacturing process according to claim 14, wherein in step a) the flaps of the lower part of the reinforcing elements are disposed inside the laminate of the web of the frames.

16. The manufacturing process according to claim 14, wherein the shape of the cross section of the frames is selected from the group consisting of I and J.

* * * * *